(12) United States Patent
Akao et al.

(10) Patent No.: US 11,964,904 B2
(45) Date of Patent: Apr. 23, 2024

(54) GLASS SUBSTRATE WITH ANTIREFLECTION FILM, AND OPTICAL MEMBER

(71) Applicant: AGC Inc., Tokyo (JP)

(72) Inventors: Yasuhiko Akao, Tokyo (JP); Teruo Fujiwara, Tokyo (JP)

(73) Assignee: AGC INC., Tokyo (JP)

( * ) Notice: Subject to any disclaimer, the term of this patent is extended or adjusted under 35 U.S.C. 154(b) by 914 days.

(21) Appl. No.: 16/929,343

(22) Filed: Jul. 15, 2020

(65) Prior Publication Data

US 2020/0346973 A1 Nov. 5, 2020

Related U.S. Application Data (63) Continuation of application No. PCT/JP2019/003151, filed on Jan. 30, 2019.

(30) Foreign Application Priority Data

Jan. 31, 2018 (JP) .................................. 2018-015905
Oct. 1, 2018 (JP) .................................. 2018-186777

(51) Int. Cl.
*B32B 3/00* (2006.01)
*C03C 3/062* (2006.01)
(Continued)

(52) U.S. Cl.
CPC .......... *C03C 17/3417* (2013.01); *C03C 3/062* (2013.01); *C03C 3/064* (2013.01); *C03C 3/066* (2013.01); *C03C 3/068* (2013.01); *C03C 3/097* (2013.01); *G02B 1/115* (2013.01); *C03C 2217/212* (2013.01); *C03C 2217/213* (2013.01);
(Continued)

(58) Field of Classification Search
CPC ........................ C03C 17/3417; C03C 2217/33
See application file for complete search history.

(56) References Cited

U.S. PATENT DOCUMENTS

| 5,952,256 A | 9/1999 | Morishita et al. |
| 9,670,089 B2 * | 6/2017 | Yanase .................... C03C 3/091 |

(Continued)

FOREIGN PATENT DOCUMENTS

| CN | 1135207 C | 1/2004 |
| CN | 101111783 A | 1/2008 |

(Continued)

OTHER PUBLICATIONS

International Searching Authority, "International Search Report," issued in connection with International Patent Application No. PCT/JP2019/003151, dated Apr. 23, 2019.

(Continued)

*Primary Examiner* — Elizabeth E Mulvaney
(74) *Attorney, Agent, or Firm* — Foley & Lardner LLP (57) ABSTRACT

To provide a glass substrate with an antireflection film, which employs glass having high refractive index and which has excellent strength, and an optical member comprising it. A glass substrate with an antireflection film, comprising a glass substrate which consists of glass having refractive index ($n_d$) of from 1.68 to 2.00 and which has plate thickness of from 0.01 to 2 mm, and an antireflection film formed on at least one principal plane of the glass substrate.

16 Claims, 2 Drawing Sheets

(51) Int. Cl.
*C03C 3/064* (2006.01)
*C03C 3/066* (2006.01)
*C03C 3/068* (2006.01)
*C03C 3/097* (2006.01)
*C03C 17/34* (2006.01)
*G02B 1/115* (2015.01)

(52) U.S. Cl.
CPC .. *C03C 2217/734* (2013.01); *C03C 2218/154* (2013.01)

(56) References Cited

U.S. PATENT DOCUMENTS

| | | |
|---|---|---|
| 2007/0279750 A1 | 12/2007 | Yaoita et al. |
| 2014/0078589 A1* | 3/2014 | Fujii ............... G02B 1/11 359/601 |
| 2014/0106141 A1 | 4/2014 | Bellman et al. |
| 2015/0322270 A1 | 11/2015 | Amin et al. |
| 2018/0082914 A1 | 3/2018 | Hanawa et al. |

FOREIGN PATENT DOCUMENTS

| | | |
|---|---|---|
| CN | 104553126 A | 4/2015 |
| JP | 2009-162989 A | 7/2009 |
| JP | 2009-193029 A | 8/2009 |
| JP | 2011-213568 A | 10/2011 |
| JP | 2014-056215 A | 3/2014 |
| JP | 2014-095877 A | 5/2014 |
| JP | 2015-536893 A | 12/2015 |
| JP | 6328125 B2 | 5/2018 |
| WO | WO-2010/126141 A1 | 11/2010 |
| WO | WO-2014/030599 A1 | 2/2014 |
| WO | WO-2016/190303 A1 | 12/2016 |

OTHER PUBLICATIONS

International Searching Authority, "Written Opinion," issued in connection with International Patent Application No. PCT/JP2019/003151, dated Apr. 23, 2019.

* cited by examiner

Unit: mm

GLASS SUBSTRATE WITH ANTIREFLECTION FILM, AND OPTICAL MEMBER

CROSS-REFERENCE TO RELATED PATENT APPLICATIONS

This application is a continuation of PCT Application No. PCT/JP2019/003151, filed on Jan. 30, 2019, which is based upon and claims the benefit of priority from Japanese Patent Application Nos. 2018-015905, filed on Jan. 31, 2018, and 2018-186777, filed on Oct. 1, 2018. The contents of those applications are incorporated herein by reference in their entireties.

TECHNICAL FIELD

The present invention relates to a glass substrate with an antireflection film and an optical member comprising it.

BACKGROUND ART

Glass to be used for wearable devices, for example, glasses with a projector, glasses/goggles with display, VR/AR display and a virtual image display device is required to have high refractive index (for example, refractive index $n_d$ of at least 1.68) so as to achieve a wide angle of an image, to achieve high brightness and high contrast, to improve light guide properties, to improve processability of a diffraction grating, etc., and is required to be formed into a thin plate for weight saving. Further, heretofore, a small size imaging glass lens with a wide imaging field angle has been used for on-vehicle cameras, visual sensors for robot, etc., and such an imaging glass lens is required to have high refractive index so as to photograph a wider range with a smaller device.

Further, for general glass, an antireflection film may sometimes be formed on a glass surface, particularly at least one of a pair of facing principal planes, for the purpose of reducing external light reflection and improving the light transmittance.

On the other hand, it has been known that if a thin film is formed on at least one surface of a glass plate, the surface strength on the opposite side of the glass plate from the thin film decreases, and so as to prevent the decrease of the strength, it has been proposed to form an insulating film comprising an organic compound between the glass plate and the thin film (for example, Patent Document 1).

PRIOR ART DOCUMENTS

Patent Documents

Patent Document 1: WO2014/030599

DISCLOSURE OF INVENTION

Technical Problem

It has also been known that of a glass plate having a low reflection film, surface strength on the opposite side from the low reflection film decreases. The degree of the decrease of the surface strength varies depending upon the material of the film, and if the degree is remarkable, the surface strength after film formation may sometimes be about a half of that before film formation.

Further, for application to e.g. wearable devices, VR/AR displays and virtual image display devices, processing such as pattern formation by imprinting may sometimes be conducted on a principal plane of the glass. The glass to be used for the above application is preferably free from breakage of a glass plate, however, if a glass plate having low strength is used, it may be broken e.g. at the time of the processing.

Further, usually, glass having a composition with a high refractive index tends to have low strength. Accordingly, it is expected to be difficult to produce glass with a film having improved optical properties by film deposition on high refractive index glass having a refractive index of at least 1.68, and such a member may not be provided.

Under these circumstances, the present invention has been made to solve the above problems, and its object is to provide a glass substrate with an antireflection film having a high refractive index and excellent strength, and an optical member comprising it.

Solution to Problem

The present inventors have found that by combining glass having specific properties (for example, refractive index of at least 1.68) and an antireflection film, surface strength is not decreased but is rather improved, while desired low reflection properties are obtained, and solved the above problem.

The glass substrate with an antireflection film of the present invention comprises a glass substrate which consists of glass having refractive index ($n_d$) of from 1.68 to 2.00 and which has plate thickness of from 0.01 to 2 mm, and an antireflection film formed on at least one principal plane of the glass substrate.

The optical member of the present invention comprises the glass substrate with an antireflection film of the present invention.

Advantageous Effects of Invention

The glass substrate with an antireflection film of the present invention has a high refractive index and has excellent strength. Accordingly, an optical member having high refractive index and high strength can be obtained.

BRIEF DESCRIPTION OF DRAWINGS

FIG. 3(A) is a plan view.

DESCRIPTION OF EMBODIMENTS

Now, the glass substrate with an antireflection film and the optical member of the present invention will be described.

The glass substrate with an antireflection film of the present invention comprises a glass substrate which consists of glass having refractive index ($n_d$) of at least 1.68 and at most 2.00 and which has plate thickness of at least 0.01 mm and at most 2 mm, and an antireflection film. The antireflection film is formed on at least one principal plane of the glass substrate. The antireflection film may be formed on both principal planes of the glass substrate.

The glass substrate with an antireflection film of the present invention is such that the hardness of the antireflection film (hereinafter sometimes referred to as film hardness) is preferably at least 3.0 GPa and at most 6.0 GPa, more preferably at least 3.5 GPa and at most 5.0 GPa. This film hardness is a value measured by nanoindentation method using a Berkovich indenter under a load of 100 μN on the surface having the antireflection film. By the film hardness being within the above range, damage on the antireflection film surface which may be an origin of breakage of the glass substrate with an antireflection film can be suppressed, and damage or breakage of the glass substrate with an antireflection film at the time of processing or use can be suppressed. Further, the following preferred surface strength is likely to be realized with respect to glass having the after-described composition.

The glass substrate with an antireflection film of the present invention is preferably such that the surface strength of the surface having the antireflection film is at least 600 N and at most 1,200 N, as calculated as a glass substrate thickness of 0.5 mm, as measured by ring-on-ring (ROR) test. The surface strength as calculated as 0.5 mm is more preferably at least 700 N and at most 1,100 N, further preferably at least 750 N and at most 950 N. The surface strength is average fracture strength (load) of the surface having the antireflection film of the glass substrate with an antireflection film. The surface strength by the ROR test is measured as follows. The glass substrate with an antireflection film is placed on a support ring (having a diameter of 30 mm based on the center) so that their centers agree with each other and that the surface having the antireflection film faces the support ring, and from above the center of the glass substrate with an antireflection film, a load ring having a diameter of 10 mm (based on the center) is pressed to apply a load so that its center agrees with the center of the support ring, and the load when the glass substrate with an antireflection film is broken is measured as the surface strength. The method of measuring the surface strength by the ROR test is in accordance with ASTM C1499-01 or DIN52292.

Calculation of the surface strength as a glass substrate thickness of 0.5 mm is conducted by proportion calculation by the square of the ratio of the glass substrate thickness of the glass substrate with an antireflection film actually measured and the reference thickness (0.5 mm). The glass substrate with an antireflection film of the present invention, of which the surface strength of the surface having the antireflection film as calculated as a 0.5 mm thickness is within the above range, has excellent strength and is prevented from being damaged or broken at the time of processing or use.

The glass substrate with an antireflection film of the present invention has a luminous reflectance of preferably at most 2%, more preferably at most 1%. When the luminous reflectance is within such a range, reflection can sufficiently be prevented. The luminous reflectance is defined in accordance with JIS Z8701. As the light source, a D65 light source is used.

The glass substrate with an antireflection film of the present invention is preferably such that the antireflection film surface has a surface roughness (Ra) of at most 2.0 nm. When Ra is at most 2.0 nm, diffuse reflection on the antireflection film surface is suppressed, and ghost images and distortion can be prevented. Ra is more preferably at most 1.7 nm, further preferably at most 1.4 nm, still more preferably at most 1.2 nm, particularly preferably at most 1 nm. Ra is arithmetic mean roughness defined by JIS B0601 (2001), and in this specification, it is a value measured with respect to a 2 μm×2 μm square area by an atomic force microscope (AFM).

<Glass Substrate>

In the glass substrate with an antireflection film of the present invention, the glass substrate consists of glass having refractive index ($n_d$) of from 1.68 to 2.00. The glass substrate with an antireflection film of the present invention, with refractive index ($n_d$) of at least 1.68, is suitably used for wearable devices, to achieve a wide angle of an image, to achieve high brightness and high contrast, to improve light guide properties, to achieve processing easiness of a diffraction grating, etc. Further, it is suitable as a small size imaging glass lens with a wide imaging field angle to be used for on-vehicle cameras, visual sensors for robot, etc., so as to photograph a wider range with a smaller device. $n_d$ is preferably at least 1.70, more preferably at least 1.73, further preferably at least 1.74, still more preferably at least 1.75.

On the other hand, glass having $n_d$ of higher than 2.00 tends to have high density and tends to have too high devitrification temperature. Accordingly, $n_d$ is at most 2.00, preferably at most 1.90, more preferably at most 1.85, further preferably at most 1.83, still more preferably at most 1.82, particularly preferably at most 1.81, most preferably at most 1.80.

The refractive index of the glass is measured by processing glass to be measured into a triangular prism, one side of which is 30 mm and which has thickness of 10 mm, and measuring its refractive index by a refractometer (manufactured by Kalnew, equipment: KPR-2000, or the like).

In the glass substrate with an antireflection film of the present invention, the glass substrate has thickness of from 0.01 to 2.0 mm. When the thickness is at least 0.01 mm, it is possible to prevent the glass substrate or the glass substrate with an antireflection film from being damaged when handled or processed. Further, warpage of the glass substrate with an antireflection film by its own weight can be suppressed. The thickness is more preferably at least 0.1 mm, further preferably at least 0.3 mm, still more preferably at least 0.5 mm. On the other hand, when the thickness is at most 2.0 mm, an optical device using the glass substrate with an antireflection film can be made light in weight. The thickness is more preferably at most 1.5 mm, further preferably at most 1.0 mm, still more preferably at most 0.8 mm.

The density (d) of the glass to be used for the glass substrate with an antireflection film of the present invention is preferably at most 4.0 g/cm$^3$, whereby the glass substrate with an antireflection film of the present invention can achieve favorable feeling of wear of a user when used for wearable devices, and can reduce the weight of the whole device when used for on-vehicle cameras, visual sensors for robot, etc. d is preferably at most 3.8 g/cm$^3$, more preferably at most 3.6 g/cm$^3$, further preferably at most 3.5 g/cm$^3$, still more preferably at most 3.4 g/cm$^3$.

On the other hand, in order to prevent the glass substrate surface from being scarred, d is preferably at least 2.0 g/cm$^3$. It is more preferably at least 2.2 g/cm$^3$, further preferably at least 2.3 g/cm$^3$, still more preferably at least 2.4 g/cm$^3$. The density (d) of the glass may be measured in accordance with JIS Z8807 (1976, measurement method of weighing in liquid).

Further, the glass to be used for the glass substrate with an antireflection film of the present invention preferably has such a viscosity that a temperature $T_2$ at which the viscosity of the glass is log η=2 is from 800 to 1,200° C. log is common logarithm ($\log_{10}$), and η is the viscosity when the shear stress is 0. $T_2$ is the standard temperature for melting property, and if $T_2$ of the glass is too high, it is necessary to melt the glass at high temperature, and accordingly in the case of a high refractive index glass, the visible light transmittance particularly in short wavelength may decrease. $T_2$ is preferably at most 1,180° C., more preferably at most 1,150° C., further preferably at most 1,130° C., still more preferably at most 1,110° C.

On the other hand, if $T_2$ is too low, the viscosity curve becomes steep, and it tends to be difficult to control the viscosity at the time of production. By the glass to be used for the glass substrate with an antireflection film of the present invention having $T_2$ within the above range, favorable production property is achieved. $T_2$ is preferably at least 970° C., more preferably at least 990° C., further preferably at least 1,010° C., still more preferably at least 1,030° C.

The temperature $T_2$ at which the viscosity $\eta$ is log $\eta=2$ may be obtained from the measurement results of the viscosity, measured by a rotary viscometer, while heating a sample.

The devitrification temperature of the glass to be used for the glass substrate with an antireflection film is preferably at most 1,200° C. Having such a property, devitrification of the glass at the time of formation can be suppressed, and favorable forming property is achieved. The devitrification temperature is more preferably at most 1,175° C., further preferably at most 1,150° C., still more preferably at most 1,125° C., particularly preferably at most 1,100° C.

The devitrification temperature is the lowest temperature at which no crystal of 1 μm or larger by the long side or the major axis is confirmed on the surface and in the interior of the glass, when heated and molten glass is air-cooled. The devitrification temperature is measured, specifically, in such a manner that about 5 g of a sample is put in a platinum dish, and kept at from 1,000° C. to 1,400° C. every 5° C. each for one hour and air-cooled, and whether or not crystals are precipitated is observed by a microscope, and the minimum temperature at which no crystal of 1 μm or larger by the long side or the major axis is confirmed, is taken as the devitrification temperature.

Further, wearable devices are required such that a decrease of the transmittance to visible light is suppressed, however, the transmittance of the glass to be used for the glass substrate with an antireflection film of the present invention may decrease on wavelength shorter than 400 nm by the glass being melted at high temperature. Further, on-vehicle cameras and visual sensors for robot sometimes employ near infrared images to recognize objects which can hardly be distinguished by visual light, and glass to be used for such an optical system is required to have a high transmittance in the near ultraviolet region.

Accordingly, the glass to be used for the glass substrate with an antireflection film of the present invention has a light transmittance ($T_{360}$) at wavelength of 360 nm of preferably at least 30%, when formed into a glass plate having thickness of 1 mm. When the glass has such a property, it is suitable as glass to be used for wearable devices and on-vehicle cameras. Particularly of a light guide which displays an image or a video image in wearable devices, which has a long optical path length, the light loss in short wavelength is large. In the present invention, since the transmittance of the glass to be used, in short wavelength, is so high as at least 30%, the above light loss in short wavelength is suppressed, whereby desired colors can readily be reproduced without decreasing the transmittance in the entire visible region. Further, brightness of a video image or an image will not be lowered. $T_{360}$ is more preferably at least 40%, further preferably at least 50%, still more preferably at least 60%, particularly preferably at least 65%, most preferably at least 70%. $T_{360}$ may be measured, for example, by a spectrophotometer (e.g. U-4100 manufactured by Hitachi High-Tech Corporation), with respect to a glass plate having thickness of 1 mm and having both surfaces mirror-polished.

Further, the glass to be used for the glass substrate with an antireflection film of the present invention has a Young's Modulus (E) of preferably at least 60 GPa. Having such a property, when the glass substrate with an antireflection film of the present invention is used for wearable devices as a thin glass plate or when used for on-vehicle cameras, visual sensors for robot, etc. as a lens, warpage tends to be small. Particularly when used for a light guide, ghost images and distortion of an image or a video image can be prevented when attached to glasses frames or a display device. E is more preferably at least 70 GPa, further preferably at least 80 GPa, still more preferably at least 85 GPa, particularly preferably at least 90 GPa. The Young's modulus (E) of the glass may be measured with respect to a sample in a plate shape of 20 mm×20 mm×1 mm in thickness, by an ultrasonic precision plate thickness meter (manufactured by Olympus Corporation, MODEL 38DL PLUS or the like) (unit: GPa).

Of the glass to be used for the glass substrate with an antireflection film of the present invention, the water resistance (RW) grade is preferably 2 or higher, as measured in accordance with Measuring Method for Chemical Durability of Optical Glass (Powder Method), Japan Optical Glass Industrial Standards JOGIS06-2008. RW is measured, specifically, as follows. With respect to a glass powder having a particle size of from 420 to 600 μm, the mass reduction rate (%) when the glass powder is immersed in 80 mL of pure water at 100° C. for one hour is measured. The glass is rated a predetermined grade in accordance with the mass reduction rate. Specifically, the grade 1: mass reduction rate of less than 0.05%, grade 2: at least 0.05% and less than 0.10%, grade 3: at least 0.10% and less than 0.25%, grade 4: at least 0.25% and less than 0.60%, grade 5: at least 0.60% and less than 1.10%, grade 6: at least 1.10%. A grade with a smaller number indicates better RW.

Further, of the glass to be used for the glass substrate with an antireflection film of the present invention, the acid resistance (RA) grade is preferably 1 or higher, as measured in accordance with Measuring Method for Chemical Durability of Optical Glass (Powder Method), JOGIS06-2008. RA is measured, specifically, as follows. With respect to a glass powder having a particle size of from 420 to 600 μm, the mass reduction rate (%) when the glass powder is immersed in 80 mL of a 0.01 N nitric acid aqueous solution at 100° C. for one hour is measured. The glass is rated a predetermined grade in accordance with the mass reduction rate. Specifically, grade 1: mass reduction rate of less than 0.20%, grade 2: at least 0.20% and less than 0.35%, grade 3: at least 0.35% and less than 0.65%, grade 4: at least 0.65% and less than 1.20%, grade 5: at least 1.20% and less than 2.20%, grade 6: at least 2.20%. A grade with a smaller number indicates better RA.

In the definitions of the water resistance (RW) and the acid resistance (RA), a predetermined grade "or higher" means being more excellent than the grade and represents a grade with a smaller number than the grade.

Further, the glass transition temperature (Tg) of the glass to be used for the glass substrate with an antireflection film of the present invention is preferably from 500 to 700° C. The glass to be used for the glass substrate with an antireflection film of the present invention, which has Tg within the above range, has favorable forming property by press molding or redraw process. Tg is more preferably from 520° C. to 680° C., further preferably from 540° C. to 660° C., still more preferably from 560° C. to 640° C., particularly preferably from 570° C. to 620° C. Tg may be measured by a differential dilatometer (TMA) in accordance with JIS R3103-3 (2001).

Further, the Abbe number ($v_d$) of the glass to be used for the glass substrate with an antireflection film of the present invention is preferably at most 50. Specifically, in a case where the glass substrate with an antireflection film of the present invention is applied to e.g. a light guide plate, by the glass having low $v_d$ within the above range, optical design of the wearable devices will be easy, and chromatic aberration will readily be improved, whereby a beautiful image or video image can be reproduced. $v_d$ is more preferably at most 46, further preferably at most 42, still more preferably at most 38, particularly preferably at most 34. The lower limit of the Abbe number of the glass is not particularly limited, and is approximately at least 10, specifically at least 15, more specifically at least 20 in many cases.

The Abbe number of the glass may be calculated, for example, with respect to the sample used for the refractive index measurement, in accordance with $v_d=(n_d-1)/(n_F-n_C)$. $n_d$, $n_F$ and $n_C$ are refractive indices to helium d line, hydrogen F line and hydrogen C line, respectively. These refractive indices may also be measured using the above refractometer.

Further, the glass to be used for the glass substrate with an antireflection film of the present invention has a coefficient of thermal expansion ($\alpha$) at from 50 to 350° C. of preferably within a range of from 50 to 150($\times 10^{-7}$/K). When the glass to be used for the glass substrate with an antireflection film of the present invention has a within the above range, its expansion well matches peripheral members. $\alpha$ is more preferably from 60 to 135 ($\times 10^{-7}$/K), further preferably from 70 to 120 ($\times 10^{-7}$/K), still more preferably from 80 to 105 ($\times 10^{-7}$/K), particularly preferably from 90 to 100($\times 10^{-7}$/K).

The thermal expansion coefficient ($\alpha$) may be obtained by measuring a coefficient of linear thermal expansion coefficient within a range of from 30 to 350° C. by a differential dilatometer (TMA) and determining the average coefficient of linear thermal expansion within a range of from 30 to 350° C. in accordance with JIS R3102 (1995).

Of the glass substrate to be used for the glass substrate with an antireflection film of the present invention, the area of one principal plane is preferably at least 8 $cm^2$. When the area is at least 8 $cm^2$, large number of optical devices can be disposed, thus improving the productivity. The area is more preferably at least 30 $cm^2$, further preferably at least 170 $cm^2$, still more preferably at least 300 $cm^2$, particularly preferably at least 1,000 $cm^2$. On the other hand, when the area is at most 6,500 $cm^2$, the glass substrate can easily be handled, and it is possible to prevent the glass substrate and the glass substrate with an antireflection film from being damaged when handled or processed. The area is more preferably at most 4,500 $cm^2$, further preferably at most 4,000 $cm^2$, still more preferably at most 3,000 $cm^2$, particularly preferably at most 2,000 $cm^2$.

Of the glass substrate to be used for the glass substrate with an antireflection film of the present invention, LTV (Local Thickness Variation) in 25 $cm^2$ of one principal plane is preferably at most 2 μm. By the glass substrate having flatness within such a range, a nanostructure having a desired shape can be formed on one principal plane of the glass substrate e.g. by imprinting, and desired light guide properties can be obtained. Particularly, in the case of a light guide, ghost images and distortion due to difference in the optical path length can be prevented. LTV is more preferably at most 1.8 μm, further preferably at most 1.6 μm, still more preferably at most 1.4 μm, particularly preferably at most 1.2 μm.

LTV of the glass substrate can be measured as follows. The plate thickness of the glass substrate is measured at 3 mm intervals with respect to a plate-shape sample of 50 mm×50 mm×1 mm in thickness by a non-contact laser displacement gauge (for example, NANOMETRO manufactured by KURODA PRECISION INDUSTRIES LTD.) to calculate LTV.

When the glass to be used for the glass substrate with an antireflection film of the present invention is formed into a circular glass plate having a diameter of 8 inches, the warpage is preferably at most 50 μm. When the warpage of the glass plate is at most 50 μm, a nanostructure having desired shape can be formed on one principal plane e.g. by imprinting, and desired light guide properties can be obtained. When a plurality of light guides are to be obtained, products with stable quality can be obtained. The warpage of the glass plate is more preferably at most 40 μm, further preferably at most 30 μm, particularly preferably at most 20 μm.

Further, when the glass is formed into a circular glass plate having a diameter of 6 inches, the warpage is preferably at most 30 μm. When the warpage of the glass plate is at most 30 μm, a nanostructure having a desired shape can be formed on one principal plane e.g. by imprinting, and desired light guide properties can be obtained. When a plurality of light guides are to be obtained, products with stable quality can be obtained. The warpage of the glass plate is more preferably at most 20 μm, further preferably at most 15 μm, particularly preferably at most 10 μm.

Figure 1:
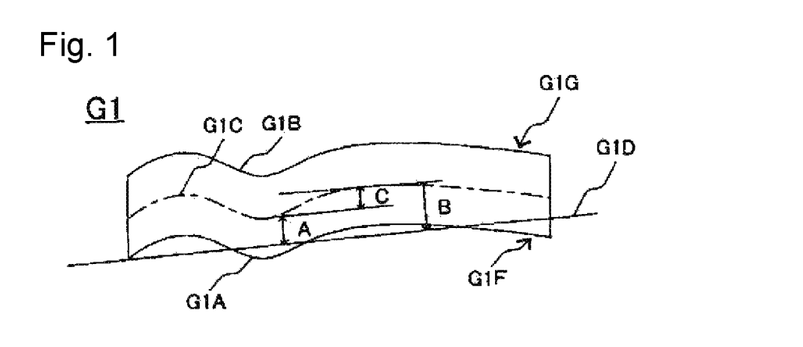
FIG. 1 is a cross-sectional view schematically illustrating an optical glass to describe warpage of the optical glass.

FIG. 1 is a cross sectional view illustrating glass to be used for the glass substrate with an antireflection film of the present invention, formed into a glass plate G1. The "warpage" is, in an optional cross section which passes the center of one principal plane G1F of the glass plate G1 and which is orthogonal to the one principal plane G1F of the glass plate G1, the difference C between the maximum distance B and the minimum distance A in the vertical direction between the base line G1D of the glass plate G1 and the center line G1C of the glass plate G1.

The nodal line of the optional orthogonal cross section and the one principal plane G1F of the glass plate G1 is taken as the bottom line G1A. The nodal line of the optional orthogonal cross section and the other principal plane G1G of the glass plate G1 is taken as the upper line G1B. The center line G1C is a line formed by connecting centers in the plate thickness direction of the glass plate G1. The center line G1C is calculated from midpoints between the bottom line G1A and the upper line G1B in the after-described laser irradiation direction.

The base line G1D is obtained as follows. First, the bottom line G1A is calculated by a measurement method which cancels the influence by the glass plate's own weight. A straight line is obtained from the bottom line G1A by least-squares method. The obtained straight line is the standard line G1D. As the measurement method to cancel the influence by the glass plate's own weight, a known method may be employed.

For example, the glass plate G1 is supported at three points on the one principal plane G1F, the glass plate G1 is irradiated with laser by a laser displacement gauge, and the heights of the one principal plane G1F and the other principal plane G1G of the glass plate G1 from an optional reference plane are measured.

Then, the glass plate G1 is turned upside down, and is supported at three points on the other principal plane G1G facing the three points which have supported the one principal plane G1F, and the heights of the one principal plane G1F and the other principal plane G1G of the glass substrate G1 from an optional reference plane are measured.

The averages of the heights at the respective measurement points before and after turning are obtained, whereby the influence by the glass plate's own weight is cancelled. For example, before turning, as described above, the height of the one principal plane G1F is measured. After the glass plate G1 is turned upside down, the height of the other principal plane G1G is measured at a position corresponding to the measurement point on the one principal plane G1F. Similarly, before turning, the height of the other principal plane G1G is measured. After the glass plate G1 is turned upside down, the height of the one principal plane G1F is measured at a position corresponding to the measurement point on the other principal plane G1G.

The warpage may be measured, for example, by a laser displacement gauge (for example, a non-contact laser displacement gauge manufactured by KURODA PRECISION INDUSTRIES LTD., NANOMETRO).

Further, of the glass substrate to be used for the glass substrate with an antireflection film of the present invention, the surface roughness Ra on one principal plane is preferably at most 2 nm. By the optical glass having Ra within such a range, a nanostructure having a desired shape can be formed on one principal plane e.g. by imprinting, and desired light guide properties can be obtained. Particularly in the case of a light guide, diffuse reflection at an interface is suppressed, whereby ghost images and distortion can be prevented. The surface roughness Ra is more preferably at most 1.7 nm, further preferably at most 1.4 nm, still more preferably at most 1.2 nm, particularly preferably at most 1 nm. Ra is the arithmetic mean roughness defined by JIS B0601 (2001), and in this specification, it is a value measured with respect to a 2 μm×2 μm square by an atomic force microscope (AFM). In a case where the glass substrate with an antireflection film has an antireflection film on only one principal plane, it is on a principal plane opposite from the principal plane having the antireflection film that the nanostructure is formed, and therefore the surface roughness Ra of the principal plane is preferably within the above range.

[Glass Component]

Now, composition ranges of the respective components which the glass according to the present embodiment may contain, according to an embodiment, will be described in detail. In this specification, the contents of the respective components are represented by mass % to the total mass of the glass base composition based on oxides, unless otherwise specified. Further, the glass used in the present invention "containing substantially no" means that the substance is not contained excluding inevitable impurities. The content of inevitable impurities in the present invention is at most 0.1%.

As the base composition which satisfies properties such as high refractive index and favorable light transmittance and further high solubility, in the glass used in the present invention, for example, a composition may be mentioned, as represented by mass % based on oxides, as a glass-forming component, from 5 to 80 mass % of at least one member selected from the group consisting of $SiO_2$, $B_2O_3$ and $P_2O_5$, as a modified oxide, from 5 to 70 mass % in total of at least one oxide selected from the group consisting of MgO, CaO, SrO, BaO, ZnO, $Li_2O$, $Na_2O$, $K_2O$, $Cs_2O$ and $Ln_2O_3$ (wherein Ln is at least one member selected from the group consisting of Y, La, Gd, Yb and Lu), and as an intermediate oxide, from 0 to 50 mass % in total of at least one oxide selected from the group consisting of $Al_2O_3$, $TiO_2$, $ZrO_2$, $WO_3$, $Bi_2O_3$, $TeO_2$, $Ta_2O_5$ and $Nb_2O_5$.

As such a glass composition, specifically, (1) La—B type, (2) $SiO_2$ type or (3) $P_2O_5$ type glass may be mentioned. In the description of the content in the glass composition, "%" represents "mass %" unless otherwise specified.

(1) La—B type glass may, for example, be glass containing from 5 to 70% of $La_2O_3$ and from 5 to 70% of $B_2O_3$ based on the total content of the base composition being 100%.

By the glass containing at least 5% of $Al_2O_3$ component, the desired high refractive index is achieved, and dispersion can be decreased (the Abbe number is increased). The content of the $La_2O_3$ component is preferably at least 10%, more preferably 15%, further preferably at least 20%, still more preferably at least 25%.

On the other hand, when the content of the $La_2O_3$ component is at most 70%, a decrease of the melting property of the glass can be suppressed, and devitrification resistance of the glass can be increased. The content of the $L_2O_3$ component is preferably at most 60%, more preferably at most 50%, further preferably at most 40%, still more preferably at most 30%.

$B_2O_3$ is a glass forming component, and the content of $B_2O_3$ is preferably from 5 to 70% based on the total content of the base composition being 100%.

By the glass containing at least 5% of the $B_2O_3$ component, the devitrification resistance of the glass can be increased, and dispersion of the glass can be decreased. The content of the $B_2O_3$ component is preferably at least 10%, more preferably at least 15%, further preferably at least 20%.

On the other hand, by the content of the $B_2O_3$ component being at most 70%, higher refractive index will readily be obtained, and deterioration of chemical durability can be suppressed. Accordingly, the content of the $B_2O_3$ component is preferably at most 50%, more preferably at most 30%, further preferably at most 30%, still more preferably at most 25%.

$SiO_2$ is a glass forming component. The content of $SiO_2$ is from 0 to 15% based on the total content of the base composition being 100%. By the glass containing $SiO_2$, high strength and crack resistance can be imparted to the glass, and the stability and chemical durability of the glass are improved. The $SiO_2$ content is preferably at least 2%, more preferably at least 4%, further preferably at least 6%. On the other hand, when the $SiO_2$ content is at most 15%, a component to achieve high refractive index can be contained. The $SiO_2$ content is preferably at most 10%, more preferably at most 8%.

MgO is an optional component. The MgO content is preferably from 0 to 20% based on the total content of the base composition being 100%. By the glass containing the MgO component, mechanical strength of the glass can be improved. The MgO content is more preferably at least 1%, further preferably at least 3%. When the MgO content is at most 20%, the devitrification temperature can be lowered, and preferred production properties will be obtained. The MgO content is more preferably at most 15%, further preferably at most 10%, still more preferably at most 5%.

CaO is an optional component. The CaO content is preferably from 0 to 30% based on the total content of the base composition being 100%. By the glass containing the CaO component, chemical durability of the glass can be improved. The CaO content is more preferably at least 1%, further preferably at least 3%, still more preferably at least 5%, particularly preferably at least 10%. When the CaO content is at most 30%, the devitrification temperature tends to be low, and preferred production properties will be obtained. The CaO content is more preferably at most 20%, further preferably at most 15%.

SrO is an optional component. The SrO content is preferably from 0 to 30% based on the total content of the base composition being 100%. By the glass containing the SrO component, the refractive index of the glass can be improved. The SrO content is more preferably at least 1%, further preferably at least 3%. When the SrO content is at most 30%, the devitrification temperature tends to be low, and preferred production properties will be obtained. The SrO content is more preferably at most 20%, further preferably at most 15%, still more preferably at most 10%, particularly preferably at most 5%.

BaO is an optional component. The BaO content is preferably from 0 to 40% based on the total content of the base composition being 100%. By the glass containing the BaO component, the refractive index of the glass can be improved. The BaO content is more preferably at least 1%, further preferably at least 3%, still more preferably at least 5%. When the BaO content is at most 40%, the devitrification temperature tends to be low, and favorable production properties will be obtained. The BaO content is more preferably at most 30%, further preferably at most 20%, still more preferably at most 15%, particularly preferably at most 10%.

ZnO is an optional component. The ZnO content is preferably from 0 to 30% based on the total content of the base composition being 100%. By the glass containing the ZnO component, the refractive index of the glass can be improved. The ZnO content is more preferably at least 1%, further preferably at least 3%. When the ZnO content is at most 30%, the devitrification temperature tends to be low, and favorable production properties will be obtained. The ZnO content is more preferably at most 20%, further preferably at most 15%, still more preferably at most 10%, particularly preferably at most 5%.

$Li_2O$ is an optional component. The $Li_2O$ content is preferably from 0 to 15% based on the total content of the base composition being 100%. When $Li_2O$ is contained, the strength (Kc) and the crack resistance (CIL) can be improved. The $Li_2O$ content is more preferably at least 0.5%, further preferably at least 1%, still more preferably at least 3%. On the other hand, when the $Li_2O$ content is at most 15%, the devitrification temperature tends to be low, and favorable production properties will be obtained. The $Li_2O$ content is preferably at most 10%, more preferably at most 7%, further preferably at most 5%, particularly preferably at most 4%.

$Na_2O$ is an optional component. The $Na_2O$ content is from 0 to 20% based on the total content of the base composition being 100%. When the $Na_2O$ content is at most 20%, favorable crack resistance will be obtained. The $Na_2O$ content is preferably at most 15%, more preferably at most 10%, further preferably at most 7%, particularly preferably at most 5%. When the glass according to the present embodiment contains $Na_2O$, the devitrification temperature tends to be low, and preferred production properties will be obtained. Its content is preferably at least 0.5%, more preferably at least 1%, further preferably at least 2%, particularly preferably at least 3%.

$K_2O$ is an optional component. The $K_2O$ content is from 0 to 20% based on the total content of the base composition being 100%. When the $K_2O$ content is at most 20%, favorable crack resistance will be obtained. The $K_2O$ content is preferably at most 15%, more preferably at most 10%, further preferably at most 7%. When $K_2O$ is contained, the devitrification temperature tends to be low, and favorable production properties will be obtained. The content is preferably at least 0.5%, more preferably at least 1%, further preferably at least 2%, particularly preferably at least 3%.

Further, the glass according to the present embodiment may contain an alkali metal component ($Li_2O$, $Na_2O$, $K_2O$) as an optional component. The content of $Li_2O+Na_2O+K_2O$ is from 0 to 20% based on the total content of the base composition being 100%. When the $Li_2O+Na_2O+K_2O$ content is at least 2%, $T_2$ tends to be low, and the melting temperature will be low, and coloring can be suppressed. The $Li_2O+Na_2O+K_2O$ content is preferably at least 4%, more preferably at least 6%. Further, by adjusting the $Li_2O+Na_2O+K_2O$ content to be at most 20%, the devitrification temperature is lowered, and favorable production properties will be obtained. The $Li_2O+Na_2O+K_2O$ content is preferably at most 15%, more preferably at most 10%, further preferably at most 8%. The "$Li_2O+Na_2O+K_2O$" means the total of at least one alkali metal oxide component selected from the group consisting of $Li_2O$, $Na_2O$ and $K_2O$.

In the glass according to the present embodiment, among alkali metal components, $Li_2O$ is a component which improves the strength of the glass, however, if the amount is large, $T_2$ tends to be low, and devitrification is likely to occur. Accordingly, in the glass according to the present embodiment, the $Li_2O/(Li_2O+Na_2O+K_2O)$ ratio by mass % based on oxides is preferably at most 0.45. By adjusting this ratio to be at most 0.45, $T_2$ tends to be high, devitrification hardly occurs, and glass forming property will improve. The ratio is more preferably at most 0.4, further preferably at most 0.35, particularly preferably at most 0.3.

$Cs_2O$ is an optional component. The $Cs_2O$ content is from 0 to 20% based on the total content of the base composition being 100%. When the $Cs_2O$ content is higher than 0%, the devitrification temperature tends to be low, and favorable production properties will be obtained. In a case where the glass according to the present embodiment contains $Cs_2O$, its content is preferably at least 0.5%, more preferably at least 1%, further preferably at least 2%, particularly preferably at least 3%. On the other hand, the $Cs_2O$ content is at most 20%, favorable crack resistance will be obtained. The $Cs_2O$ content is preferably at most 15%, more preferably at most 10%, further preferably at most 7%.

$Ln_2O_3$ (wherein Ln is at least one member selected from the group consisting of Y, La, Gd, Yb and Lu) is an optional component. The content of $Ln_2O_3$ in total is from 5 to 55% based on the total content of the base composition being 100%. When $Ln_2O_3$ is contained, the refractive index of the glass will be improved. The content of $Ln_2O_3$ in total is preferably at least 10%, more preferably at least 15%, further preferably at least 20%, particularly preferably at least 25%.

Further, when the $Ln_2O_3$ content is at most 55%, devitrification temperature can be lowered and in addition, the material cost can be decreased. Accordingly, the content in total is preferably at most 55%, more preferably at most 45%, further preferably at most 35%, particularly preferably at most 30%.

$Al_2O_3$ is an optional component. The $Al_2O_3$ content is from 0 to 35% based on the total content of the base composition being 100%. When $Al_2O_3$ is contained, the strength of the glass is increased and in addition, the glass stability can be improved. The $Al_2O_3$ content is preferably at least 1%, more preferably at least 3%, further preferably at least 5%.

Further, the $Al_2O_3$ content is at most 35%, the devitrification temperature tends to be low, and favorable production properties will be obtained. The $Al_2O_3$ content is preferably at most 20%, more preferably at most 10%, further preferably at most 8%.

$TiO_2$ is an optional component. The $TiO_2$ content is from 0 to 35% based on the total content of the base composition being 100%. When $TiO_2$ is contained, the refractive index of the glass is increased, and the glass stability can be improved. The $TiO_2$ content is preferably at least 1%, more preferably at least 5%, further preferably at least 7%, particularly preferably at least 10%.

Further, when the $TiO_2$ content is at most 35%, the devitrification temperature tends to be low, and coloring of the glass can be suppressed. The $TiO_2$ content is preferably at most 25%, more preferably at most 20%, further preferably at most 15%.

$ZrO_2$ is an optional component. The $ZrO_2$ content is from 0 to 30% based on the total content of the base composition being 100%. When $ZrO_2$ is contained, the refractive index of the glass is increased, and chemical durability can be improved. The $ZrO_2$ content is preferably at least 1%, more preferably at least 5%, further preferably at least 10%, particularly preferably at least 15%.

Further, when the $ZrO_2$ content is at most 30%, the devitrification temperature tends to be low, and favorable production properties will be obtained. The $ZrO_2$ content is preferably at most 20%, more preferably at most 15%.

$WO_3$ is an optional component. The $WO_3$ content is from 0 to 30% based on the total content of the base composition being 100%. When $WO_3$ is contained, the refractive index of the glass can be improved. The $WO_3$ content is preferably at least 1%, more preferably at least 3%, further preferably at least 5%, particularly preferably at least 10%.

Further, when the $WO_3$ content is at most 30%, the devitrification temperature will be low, and the coloring of the glass can be suppressed. The $WO_3$ content is preferably at most 20%, more preferably at most 15%.

$Bi_2O_3$ is an optional component. The $Bi_2O_3$ content is from 0 to 55% based on the total content of the base composition being 100%. When $Bi_2O_3$ is contained, the refractive index of the glass can be improved. The $Bi_2O_3$ content is preferably at least 1%, more preferably at least 5%, further preferably at least 5%, particularly preferably at least 10%.

Further, when the $Bi_2O_3$ content is at most 55%, the devitrification temperature will be low, and coloring of the glass can be suppressed. The $Bi_2O_3$ content is preferably at most 35%, more preferably at most 25%, further preferably at most 15%.

$TeO_2$ is an optional component. The $TeO_2$ content is from 0 to 30% based on the total content of the base composition being 100%. When $TeO_2$ is contained, the refractive index of the glass can be improved. The $TeO_2$ content is preferably at least 1%, more preferably at least 5%.

Further, when the $TeO_2$ content is at most 30%, the devitrification temperature can be lowered and in addition, the material cost can be decreased. The $TeO_2$ content is preferably at most 20%, more preferably at most 10%.

$Ta_2O_5$ is an optional component. The $Ta_2O_5$ content is from 0 to 30% based on the total content of the base composition being 100%. When $Ta_2O_5$ is contained, the refractive index of the glass can be improved. The $Ta_2O_5$ content is preferably at least 1%, more preferably at least 5%.

Further, when the $Ta_2O_5$ content is at most 30%, the devitrification temperature can be lowered, and the material cost can be decreased. The $Ta_2O_5$ content is preferably at most 25%, more preferably at most 10%.

$Nb_2O_5$ is an optional component. The $Nb_2O_5$ content is from 0 to 35% based on the total content of the base composition being 100%. When $Nb_2O_5$ is contained, the refractive index of the glass can be improved. The $Nb_2O_5$ content is preferably at least 5%, more preferably at least 10%, further preferably at least 15%.

Further, when the $Nb_2O_5$ content is at most 35%, the devitrification temperature can be lowered and in addition, the material cost can be decreased. The $Nb_2O_5$ content is preferably at most 30%, more preferably at most 25%.

As a preferred La—B type glass composition, a high refractive index glass composition comprising, as represented by mass % based on oxides, from 20 to 35% of $La_2O_3$, from 10 to 20% of $B_2O_3$, from 0 to 10% of $SiO_2$, from 5 to 15% of CaO, from 0 to 5% of ZnO, from 5 to 15% of $TiO_2$, from 5 to 10% of $ZrO_2$, from 15 to 25% of $Nb_2O_5$, from 0 to 2% of $As_2O_3$ and from 0 to 2% of $Sb_2O_3$ may, for example, be mentioned.

(2) $SiO_2$ type glass may, for example, be glass containing from 10 to 50% of $SiO_2$, and as a high refractive index component, at least 30% of at least one member selected from the group consisting of $Nb_2O_5$, $Ta_2O_5$, $Li_2O$, SrO, BaO, $TiO_2$, $ZrO_2$, $WO_3$, $Bi_2O_3$, $TeO_2$ and $Ln_2O_3$ (wherein Ln is at least one member selected from the group consisting of Y, La, Gd, Yb and Lu).

$SiO_2$ is a glass forming component. The $SiO_2$ content is from 10 to 50% based on the total content of the base composition being 100%. When the $SiO_2$ content is at least 10%, the temperature $T_2$ at which the viscosity of the glass is log η=2 is within a preferred range, high strength and crack resistance are imparted to the glass, and stability and chemical durability of the glass can be improved. The $SiO_2$ content is preferably at least 15%, more preferably at least 20%, further preferably at least 25%, still more preferably at least 29%. On the other hand, when the $SiO_2$ content is at most 45%, a component to obtain high refractive index can be contained. The $SiO_2$ content is preferably at most 40%, more preferably at most 35%, further preferably at most 30%.

$Nb_2O_5$ is an optional component. The $Nb_2O_5$ content is at least 5% based on the total content of the base composition being 100%, whereby the refractive index of the glass is increased and in addition, the Abbe number ($v_d$) can be decreased. The $Nb_2O_5$ content is preferably at least 15%, more preferably at least 20%, further preferably at least 25%, particularly preferably at least 30%.

Further, when the $Nb_2O_5$ content is at most 70%, the devitrification temperature can be lowered and in addition, the material cost can be decreased. The $Nb_2O_5$ content is preferably at most 65%, more preferably at most 60%, further preferably at most 55%, still more preferably at most 50%.

$Ta_2O_5$ is an optional component. The $Ta_2O_5$ content is from 0 to 30% based on the total content of the base composition being 100%. When the $Ta_2O_5$ content is at least 1%, the refractive index can be improved. The $Ta_2O_5$ content is more preferably at least 5%.

Further, when the $Ta_2O_5$ content is at most 30%, the devitrification temperature can be lowered, and the material cost can be decreased. The $Ta_2O_5$ content is preferably at most 25%, more preferably at most 10%.

In the glass according to the present embodiment, as an optional component, an alkali metal component ($Li_2O$, $Na_2O$, $K_2O$) can be contained. The $Li_2O+Na_2O+K_2O$ content is from 0 to 20% based on the total content of the base composition being 100%. When the $Li_2O+Na_2O+K_2$ is at least 2%, $T_2$ tends to be low, the melting temperature will be low, and coloring can be suppressed. The $Li_2O+Na_2O+K_2O$ content is preferably at least 4%, more preferably at least 6%. Further, when the $Li_2O+Na_2O+K_2O$ content is at most 20%, the devitrification temperature is lowered, and preferred production properties will be obtained. The $Li_2O+Na_2O+K_2O$ content is preferably at most 15%, more preferably at most 10%, further preferably at most 8%.

In the glass according to the present embodiment, among alkali metal components, $Li_2O$ is a component which improves the strength of the glass, however, if its amount is large, $T_2$ tends to be low and devitrification is likely to occur. Accordingly, in the glass according to the present embodiment, the $Li_2O/(Li_2O+Na_2O+K_2O)$ ratio as represented by mass % based on oxides is preferably at most 0.45. By adjusting this ratio to be at most 0.45, $T_2$ tends to be high, devitrification hardly occurs, and the glass forming property will improve. The ratio is more preferably at most 0.4, further preferably at most 0.35, particularly preferably at most 0.3.

When the following relation between the total content (RO) of alkaline earth metal components (MgO, CaO, SrO and BaO) and the total content ($R'_2O$) of alkali metal components ($Li_2O$, $Na_2O$ and $K_2O$) satisfies $RO>2\times R'_2O$, the $Li_2O/(Li_2O+Na_2O+K_2O)$ ratio may be at least 0.75.

Further, the glass according to the present embodiment, which contains an alkali metal oxide such as $Li_2O$ or $Na_2O$, can be chemically tempered by replacing Li ions with Na ions or K ions and Na ions with K ions. That is, by chemical tempering treatment, strength of the optical glass can be improved.

$Li_2O$ is an optional component. The $Li_2O$ content is preferably from 0 to 15% based on the total content of the base composition being 100%. When $Li_2O$ is contained, the strength (Kc) and the crack resistance (CIL) can be improved. The $Li_2O$ content is more preferably at least 0.5%, further preferably at least 1%, more preferably at least 3%. On the other hand, when the $Li_2O$ content is at most 15%, the devitrification temperature tends to be low, and favorable production properties will be obtained. The $Li_2O$ content is preferably at most 10%, more preferably at most 9%, further preferably at most 7%, still more preferably at most 5%, particularly preferably at most 4%.

In a case where the glass according to the present embodiment is chemically tempered, the $Li_2O$ content is preferably at least 1.0%, more preferably at least 1.5%, further preferably at least 2.5%, particularly preferably at least 3.5%.

$Na_2O$ is an optional component, and is a component which suppresses devitrification and lowers Tg. The $Na_2O$ content is at least 0% and at most 10% based on the total content of the base composition being 100%. When $Na_2O$ is contained, an excellent devitrification-suppressing effect will be obtained. On the other hand, if the amount of $Na_2O$ is too large, strength and crack resistance are likely to decrease. When the glass of the present invention contains $Na_2O$, its content is preferably at least 0.5%, more preferably at least 1%, further preferably at least 2%, particularly preferably at least 3%. Further, the $Na_2O$ content is preferably at most 9%, more preferably at most 8%, further preferably at most 7%.

In a case where the glass according to the present embodiment is chemically tempered, the $Na_2O$ content is preferably at least 1.0%, more preferably at least 1.5%, particularly preferably at least 3.5%.

$K_2O$ is an optional component, and is a component which improves the glass melting property and is a component which suppresses devitrification. The $K_2O$ content is at least 0% and at most 10%, based on the total content of the base composition being 100%. When $K_2O$ is contained, a devitrification-suppressing effect will improve. On the other hand, if the amount of $K_2O$ is too large, the density is likely to increase. The $K_2O$ content is preferably at least 0.3%, more preferably at least 0.5%, further preferably at least 1%. Further, the $K_2O$ content is preferably at most 10%, more preferably at most 8%, further preferably at most 6%.

MgO is an optional component. MgO is a component which improves glass melting property, suppresses devitrification and adjusts optical constants such as the Abbe number and the refractive index of the glass. On the other hand, if the amount of MgO is large, devitrification will rather be accelerated. Accordingly, the MgO content is preferably at least 0% and at most 10%, based on the total content of the base composition being 100%. The MgO content is more preferably at most 8%, particularly preferably at most 6%. Further, the MgO content is preferably at least 0.3%, more preferably at least 0.5%, further preferably at least 1%.

CaO is an optional component. CaO is a component which suppresses devitrification, however, if the amount of CaO is large, crack resistance tends to decrease. Accordingly, the CaO content is preferably at least 0% and at most 15%, based on the total content of the base composition being 100%. The CaO content is more preferably at most 12%, particularly preferably at most 10%. Further, the CaO content is more preferably at least 0.3%, further preferably at least 0.5%, particularly preferably at least 1%.

SrO is an optional component. The SrO content is preferably from 0 to 30% based on the total content of the base composition being 100%. When the SrO component is contained, the refractive index of the glass can be improved. The SrO content is more preferably at least 1%, further preferably at least 3%. When the content is at most 30%, the devitrification temperature tends to be low, and favorable production properties will be obtained. The SrO content is more preferably at most 20%, further preferably at most 15%, still more preferably at most 10%, particularly preferably at most 5%.

BaO is an optional component. The BaO content is preferably from 0 to 50% based on the total content of the base composition being 100%. When the BaO component is contained, the refractive index of the glass can be improved. The BaO content is more preferably at least 1%, further preferably at least 3%, still more preferably at least 5%. When the content is at most 50%, the devitrification temperature tends to be low, and favorable production properties will be obtained. The BaO content is more preferably at most 35%, further preferably at most 20%, still more preferably at most 15%, particularly preferably at most 10%.

$TiO_2$ is an optional component. The $TiO_2$ content is from 0 to 35% based on the total content of the base composition being 100%. When $TiO_2$ is contained, the refractive index of the glass can be improved, and the glass stability can be improved. The $TiO_2$ content is preferably at least 1%, more preferably at least 1.5%, further preferably at least 2.0%, still more preferably at least 5%, particularly preferably at least 7%, most preferably at least 10%.

Further, when the $TiO_2$ content is at most 35%, the devitrification temperature tends to be low, and coloring of the glass can be suppressed. The $TiO_2$ content is preferably at most 25%, more preferably at most 20%, further preferably at most 15%.

$ZrO_2$ is an optional component. The $ZrO_2$ content is from 0 to 30% based on the total content of the base composition being 100%. When $ZrO_2$ is contained, the refractive index of the glass can be improved, and the chemical durability can be improved. The $ZrO_2$ is preferably at least 1%, more preferably at least 3.0%, further preferably at least 3.5%, still more preferably at least 5%, particularly preferably at least 10%.

Further, when the $ZrO_2$ content is at most 30%, the devitrification temperature tends to be low, and favorable production properties will be obtained. The $ZrO_2$ content is preferably at most 30%, more preferably at most 20%, still more preferably at most 15%.

$WO_3$ is an optional component. The $WO_3$ content is from 0 to 30% based on the total content of the base composition being 100%. When $WO_3$ is contained, the refractive index of the glass can be improved. The $WO_3$ content is preferably at least 1%, more preferably at least 3%, further preferably at least 5%, particularly preferably at least 10%.

Further, when the $WO_3$ content is at most 30%, the devitrification temperature tends to be low, and coloring of the glass can be suppressed. The $WO_3$ content is preferably at most 20%, more preferably at most 15%.

$Bi_2O_3$ is an optional component. The $Bi_2O_3$ content is from 0 to 55% based on the total content of the base composition being 100%. When $Bi_2O_3$ is contained, the refractive index of the glass can be improved. The $Bi_2O_3$ content is preferably at least 1%, more preferably at least 5%, further preferably at least 5%, particularly preferably at least 10%.

Further, when the $Bi_2O_3$ content is at most 55%, the devitrification temperature tends to be low, and coloring of the glass is suppressed. The $Bi_2O_3$ is preferably at most 45%, more preferably at most 42%, further preferably at most 35%, still more preferably at most 25%, particularly preferably at most 15%.

$TeO_2$ is an optional component. The $TeO_2$ content is from 0 to 30% based on the total content of the base composition being 100%. When $TeO_2$ is contained, the refractive index of the glass can be improved. The $TeO_2$ content is preferably at least 1%, more preferably at least 5%, further preferably at least 10%, particularly preferably at least 15%.

Further, when the $TeO_2$ content is at most 30%, the devitrification temperature can be lowered and in addition, the material can be decreased. The $TeO_2$ content is preferably at most 20%, more preferably at most 10%.

By the glass containing $Ln_2O_3$ (wherein Ln is at least one member selected from the group consisting of Y, La, Gd, Yb and Lu), the refractive index of the glass can be improved. The $Ln_2O_3$ content is preferably at least 1%, more preferably at least 3%, further preferably at least 5%, particularly preferably at least 10% based on the total content of the base composition being 100%. Further, when the $Ln_2O_3$ content is at most 55% based on the total content of the base composition being 100%, the devitrification tends to be low, and favorable production properties will be obtained. The $Ln_2O_3$ content is, in total, preferably at most 35%, more preferably at most 20%, particularly preferably at most 15%.

$B_2O_3$ is an optional component. $B_2O_3$ is a component which lowers Tg, and improves mechanical properties such as strength and crack resistance of the glass, however, If the amount of $B_2O_3$ is large, the refractive index tends to decrease. Accordingly, the $B_2O_3$ content is preferably at least 0% and at most 10%. The $B_2O_3$ content is more preferably at most 8.5%, further preferably at most 6.5%, particularly preferably at most 5%. Further, the $B_2O_3$ content is more preferably at least 0.3%, further preferably at least 0.5%, particularly preferably at least 1%.

$Al_2O_3$ is an optional component. $Al_2O_3$ is a component which improves chemical durability, however, if the amount of $Al_2O_3$ is large, the glass is likely to undergo devitrification. Accordingly, the $Al_2O_3$ content is preferably at least 0% and at most 5%. The $Al_2O_3$ content is more preferably at most 3%, particularly preferably at most 2%. Further, the $Al_2O_3$ content is more preferably at least 0.3%, further preferably at least 0.5%, particularly preferably at least 1%.

ZnO is an optional component, and is a component which improves mechanical properties such as strength and crack resistance of the glass. On the other hand, if the amount of ZnO is large, devitrification is likely to occur, and its content is preferably at least 0% and at most 15%. The ZnO content is more preferably at most 13%, further preferably at most 12%, particularly preferably at most 10%. Further, the ZnO content is more preferably at least 0.3%, further preferably at least 0.5%, particularly preferably at least 1%.

$La_2O_3$ is an optional component. $La_2O_3$ is a component which improves the refractive index of the glass, however, if the amount of $La_2O_3$ is too large, mechanical properties will decrease. Accordingly, the $La_2O_3$ content is preferably at least 0% and at most 30%. The $La_2O_3$ content is more preferably at most 20%, further preferably at most 12%, further preferably at most 10%, still more preferably at most 8%. It is preferred that substantially no $La_2O_3$ is contained.

$As_2O_3$ is a harmful chemical substance and thereby tends not to be used in recent years, and environmental countermeasures are required. Accordingly, in a case where environmental influences are of importance, substantially no $As_2O_3$ is preferably contained except for inevitable inclusion.

Further, the glass according to the present embodiment preferably contains at least one of $Sb_2O_3$ and $SnO_2$. They are not essential components, but may be added for the purpose of adjusting refractive index properties, improving melting properties, suppressing coloring, improving the transmittance, improving refining property and chemical durability, etc. In a case where such a component is contained, their total content is preferably at most 10%, more preferably at most 5%, further preferably at most 3%, particularly preferably at most 1%.

Further, in the glass according to the present embodiment, F is preferably contained. F is not essential, but may be added for the purpose of improving the melting property, improving the transmittance, improving refining property, etc. The F content is, if contained, preferably at most 5%, more preferably at most 3%.

As a preferred composition of the $SiO_2$ type glass ($SiO_2$ type composition A), a high refractive index glass composition may, for example, be mentioned, comprising, as represented by mass % based on oxides, from 5% to 65% of $Nb_2O_5$, from 0% to 30% at least one member selected from the group consisting of BaO, $TiO_2$, $ZrO_2$, $WO_3$ and $Ln_2O_3$ (wherein Ln is at least one member selected from the group consisting of Y, La, Gd, Yb and Lu), from 15% to 50% of $SiO_2$, and from 2% to 20% of $Li_2O+Na_2O+K_2O$, and having a $Li_2O/(Li_2O+Na_2O+K_2O)$ ratio of at most 0.45. The high refractive index glass specifically has a composition comprising $B_2O_3$: 0% to 10%, MgO: 0% to 10%, CaO: 0% to 15%, SrO: 0% to 15%, BaO: 0% to 15%, $Li_2O$: 0% to 9%, Na$_2$O: 0% to 10%, K$_2$O: 0% to 10%, Al$_2$O$_3$: 0% to 5%, TiO$_2$: 0% to 15%, WO$_3$: 0% to 15%, ZrO$_2$: 0% to 15% and ZnO: 0% to 15%.

Further, as another preferred composition of the SiO$_2$ type glass (SiO$_2$ type composition B), a high refractive index glass composition may, for example, be mentioned, comprising as represented by mass % based on oxides, from 25 to 40% of SiO$_2$, from 0 to 10% of RO, from 0 to 20% of R'$_2$O, Li$_2$O/R'$_2$O≤0.45, from 0 to 30% of Ln$_2$O$_3$ and from 20 to 55% of Nb$_2$O$_5$. Further, as another preferred composition of the SiO$_2$ type glass (SiO$_2$ composition C), a high refractive index glass composition may, for example, be mentioned, comprising, as represented by mass % based on oxides, from 15 to 30% of SiO$_2$, from 40 to 65% of Nb$_2$O$_5$, from 0 to 10% of RO, from 0 to 20% of R'$_2$O, and having Li$_2$O/R'$_2$O≤0.45. As another preferred composition (SiO$_2$ type composition D), a high refractive index glass composition may, for example, be mentioned, comprising, as represented by mass % based on oxides, from 25% to 40% of SiO$_2$, from 0 to 5% of CaO, from 3 to 10% of SrO, from 5 to 15% of BaO, from 4 to 8% of Li$_2$O, from 0.3 to 3% of Na$_2$O, RO>2×R'$_2$O, Li$_2$O/R'$_2$O of from 0.65 to 0.95, from 3 to 15% of TiO$_2$, from 3 to 8% of ZrO$_2$ and from 10 to 30% of Nb$_2$O$_5$.

(3) P$_2$O$_5$ type glass may, for example, be glass containing from 10 to 70 mass % of P$_2$O$_5$, and containing, as a high refractive index component, at least 1% of at least one member selected from the group consisting of Nb$_2$O$_5$, Ta$_2$O$_5$, Li$_2$O, SrO, BaO, TiO$_2$, ZrO$_2$, WO$_3$, Bi$_2$O$_3$, TeO$_2$ and Ln$_2$O$_3$ (wherein Ln is at least one member selected from the group consisting of Y, La, Gd, Yb and Lu).

P$_2$O$_5$ is a glass forming component constituting the glass, imparts stability to make it possible to produce the glass, and has a significant effect to lower the glass transition point and the liquid phase temperature. However, if the P$_2$O$_5$ content is less than 10% based on the total content of the base composition being 100%, no sufficient effect will be obtained. The P$_2$O$_5$ content is preferably at least 12%, more preferably at least 15%, further preferably at least 20%, still more preferably at least 30%, particularly preferably at least 40%. Further, when the P$_2$O$_5$ content is at most 70%, favorable chemical durability will be obtained. When the P$_2$O$_5$ content is preferably at most 65%, more preferably at most 60%, further preferably at most 55%, particularly preferably at most 50%.

The high refractive index components are similar to those in the above (2) SiO$_2$ type glass, and overlapping description will be omitted.

The composition and properties of the glass used in the present invention are exemplified in Table 1. The glass shown in Table 1 is glass corresponding to the above SiO$_2$ type composition. Physical properties of each glass in Table 1 are values measured in accordance with the above methods, and the devitrification viscosity is the viscosity of the glass at the devitrification temperature measured by a rotary viscometer.

TABLE 1

| Mass % | No.1 | No.2 | No.3 | No.4 | No.5 | No.6 | No.7 | No.8 |
|---|---|---|---|---|---|---|---|---|
| SiO$_2$ | 26.9 | 30.9 | 34.1 | 30.4 | 31.0 | 25.2 | 34.3 | 24.1 |
| P$_2$O$_5$ | | | | | | | | |
| B$_2$O$_3$ | 6.7 | 1.7 | 0.4 | 0.3 | 0.3 | 0.3 | 0.4 | 0.3 |
| Li$_2$O | 2.9 | 3.0 | 3.0 | 2.9 | 3.2 | 3.2 | 3.3 | 3.4 |
| Na$_2$O | 4.2 | 4.3 | 4.3 | 4.1 | 5.1 | 4.5 | 4.2 | 4.9 |
| K$_2$O | 4.2 | 4.3 | 4.4 | 4.1 | 4.4 | 4.6 | 4.1 | 4.9 |
| TiO$_2$ | | | | | | | | |
| Bi$_2$O$_3$ | | | | | | | | |
| Nb$_2$O$_5$ | 23.1 | 52.0 | 50.1 | 34.8 | 52.2 | 58.7 | 50.2 | 58.7 |
| La$_2$O$_3$ | 28.3 | | | 19.8 | | | | |
| WO$_3$ | | | | | | | | |
| ZrO$_2$ | 3.7 | 3.7 | 3.7 | 3.6 | 3.8 | 3.6 | 3.5 | 3.6 |
| Refractive index (n$_d$) | 1.74 | 1.80 | 1.78 | 1.77 | 1.81 | 1.86 | 1.78 | 1.86 |
| Density (d) [g/cm$^3$] | 3.5 | 3.4 | 3.3 | 3.6 | 3.4 | 3.6 | 3.3 | 3.6 |
| Devitrification temperature [° C.] | 1,200 | 1,060 | 1,060 | 1,200 | 1,050 | | 1,065 | |
| Temperature T$_2$ [° C.] | 966 | 1,036 | 1,078 | 1,050 | 1,042 | 962 | 1,072 | 937 |
| Devitrification viscosity | 0.8 | 1.9 | 2.2 | 1.2 | 2.0 | | 2.1 | |
| Light transmittance (T$_{360}$) [%] | | | | | | 67 | | 64 |
| Glass transition point (Tg) [° C.] | 576 | 612 | 590 | 606 | 600 | 599 | 612 | 583 |
| Young's modulus (E) [GPa] | | | | | | | | |
| Abbe number (v$_d$) | 32 | 26 | 27 | 33 | 26 | 24 | 31 | 24 |
| Coefficient of thermal expansion α (50-350° C.) [×10$^{-7}$/K] | 103 | 80 | 81 | 96 | 85 | 87 | 80 | 92 |

| Mass % | No.9 | No.10 | No.11 | No.12 | No.13 | No.14 | No.15 |
|---|---|---|---|---|---|---|---|
| SiO$_2$ | 20.5 | 21.3 | 17.7 | 21.2 | | | |
| P$_2$O$_5$ | | | | | 14.2 | 15.0 | 14.5 |
| B$_2$O$_3$ | 0.3 | 0.3 | 3.2 | 0.3 | 1.8 | 1.8 | 1.7 |
| Li$_2$O | 3.8 | 3.9 | 3.0 | 4.0 | | | |
| Na$_2$O | 4.4 | 4.6 | 5.2 | 4.4 | 4.4 | 4.6 | 4.5 |
| K$_2$O | 4.3 | 4.5 | 5.1 | 5.1 | 0.6 | 0.6 | 0.6 |

TABLE 1-continued

| | | | | | | | |
|---|---|---|---|---|---|---|---|
| $TiO_2$ | | | | 2.1 | | 2.0 | 1.9 |
| $Bi_2O_3$ | | | | | 44.9 | 41.6 | 40.3 |
| $Nb_2O_5$ | 63.5 | 58.9 | 62.6 | 59.5 | 19.9 | 23.3 | 18.2 |
| $La_2O_3$ | | | | | | | |
| $WO_3$ | | | | | 14.2 | 11.1 | 18.3 |
| $ZrO_2$ | 3.2 | 6.5 | 3.1 | 3.3 | | | |
| Refractive index ($n_d$) | 1.90 | 1.88 | 1.90 | 1.89 | 1.99 | 2.00 | 1.99 |
| Density (d) [g/cm$^3$] | 3.7 | 3.7 | 3.7 | 3.6 | | | |
| Devitrification temperature [° C.] | 1,075 | | 1,075 | 1,075 | | | |
| Temperature $T_2$ [° C.] | 1,075 | 913 | 824 | 883 | | | |
| Devitrification viscosity | 876 | | 0.8 | 1.0 | | | |
| Light transmittance ($T_{360}$) [%] | 34 | 42 | | 34 | | | |
| Glass transition point (Tg) [° C.] | 579 | 576 | 572 | 567 | 485 | 504 | 498 |
| Young's modulus (E) [GPa] | 100 | 98 | | 101 | | | |
| Abbe number ($v_d$) | 23 | 24 | 23 | 23 | 19.1 | 18.9 | 18.9 |
| Coefficient of thermal expansion α (50-350° C.) [×10$^{-7}$/K] | 92 | 94 | 94 | 96 | 104 | | |

<Antireflection Film>

The glass substrate with an antireflection film of the present invention has an antireflection film formed on at least one principal plane of the glass substrate. The antireflection film may be formed only on one principal plane of the glass substrate, or may be formed on both principal planes. The strength of the glass substrate may vary depending upon various factors, and varies also by the refractive index which is important in the present invention. In general, as the refractive index of the glass becomes higher, its strength tends to decrease. However, in the present invention, by covering a glass substrate having a refractive index of 1.68 with an antireflection film to form a glass substrate with an antireflection film, its strength can be made higher than the strength of the glass substrate alone. Particularly by controlling the film hardness, it is possible to adjust the strength to a preferred strength.

The material of the antireflection film is not particularly limited, and any material may be used so long as it can suppress light reflection. For example, as the antireflection film, a single layer film formed by a material having a lower refractive index than the glass substrate may be used. And, lower reflection property can be realized by a constitution having a high refractive index film and a low refractive index film alternately laminated. The high refractive index film here is a film having a refractive index at wavelength of 550 nm of at least 1.9, and the low refractive index film is a film having a refractive index at wavelength of 550 nm of at most 1.6.

The antireflection film may have one high refractive index film and one low refractive index film, or may have two or more layers each. In a case where the antireflection film has two or more high refractive index films and low refractive index films, preferred is a constitution having the high refractive index films and the low refractive index films alternately laminated. The antireflection film may have, in addition to the high refractive index film and the low refractive index film, a middle refractive index film having a refractive index at wavelength of 550 nm of higher than 1.6 and less than 1.9.

In order to particularly increase the antireflection performance, the antireflection film is preferably a laminate having a plurality of layers laminated, for example, preferably a laminate of two or more and 8 or less layers as a whole, more preferably a laminate of two or more and 6 or less layers. The laminate is preferably a laminate having a high refractive index film and a low refractive index film laminated as mentioned above, and the total number of the high refractive index layers and the low refractive index layers is preferably within the above range.

The material of the high refractive index film may, for example, be an oxide of indium, zirconium, cerium, titanium, tantalum, niobium, tin or the like. Specifically, $In_2O_3$, $ZrO_2$, $CeO_2$, $TiO_2$, $Ta_2O_5$, $Nb_2O_5$ or $SnO$ may, for example, be used.

The material of the low refractive index film may, for example, be silica, an oxide of aluminum or nickel ($SiO_2$, $Al_2O_3$, NiO or the like), a fluoride of calcium, magnesium or yttrium ($MgF_2$, $CaF_2$, $Y_2O_3$ or the like), or magnesium sulfate ($MgS_2$ or the like).

As the material of each of the high refractive index film and the low refractive index film, one or more may be properly selected from the above materials so that the respective refractive indices are preferably within the above preferred ranges. The high refractive index film and the low refractive index film may respectively contain an additive so long as they have the above refractive indices. Further, the material of the high refractive index film and the material of the low refractive index film may be mixed in a predetermined proportion to form a film having a desired refractive index. Further, the middle refractive index film may be formed also by using one or more of the above materials properly selected so that its refractive index is within the above range.

Particularly, in view of the productivity and the degree of the refractive index, it is more preferred that the high refractive index film is a film comprising at least one member selected from the group consisting of titanium oxide, niobium oxide and tantalum oxide, and the low refractive index film is a film comprising at least one member selected from the group consisting of silicon oxide, aluminum oxide and magnesium oxide.

The film thickness of the antireflection film is preferably at least 0.01 μm and at most 3 μm, whereby the above surface strength and film hardness are realized, and excellent strength can be imparted to the glass substrate with an antireflection film. In a case where the glass substrate with an antireflection film of the present invention has an antireflection film on both principal planes, the film thickness of the antireflection film is preferably such that the sum of the film thicknesses of the antireflection films on both principal planes is within the above range.

The antireflection film may be formed e.g. by vacuum deposition method, ion assisted deposition method employing plasma, sputtering method, ion beam sputtering method or ion plating method.

The vacuum deposition method is a method using, for example, a vacuum chamber, evaporating a film material in vacuum e.g. by resistance heating, electron gun heating or high frequency induction heating to deposit the film material on a lens or a substrate. The ion assisted deposition method is a method in which when atoms or molecules of a film material evaporated by resistance heating, electron gun heating or high frequency induction heating are physically adsorbed on a substrate, they are irradiated with ions by an ion gun to more energetically activate the atoms or molecules of the film material. For example, in a case where the deposition method is employed, by conducting deposition while the glass substrate is kept by a rotating dome and rotated, a more uniform film can be obtained. Further, the glass substrate is preferably heated e.g. by a sheath heater.

The film thickness of the film formed by deposition may be measured e.g. by a crystal oscillator film thickness monitor. By the deposition method, for example, the film hardness may be adjusted e.g. by the film deposition temperature (temperature of the substrate), the output (film deposition power) of the resistance heating or the electron gun, the gas pressure in the vacuum chamber, etc. Further, in the ion assisted deposition method, the film hardness may be adjusted also by adjusting the irradiation amount of ions applied by the ion gun.

As the film deposition method employing plasma, the ion plating method is a method of ionizing atoms or molecules of a film material evaporated by resistance heating, electron gun heating or high frequency induction heating by plasma and applying an electric field to the ions thereby to collide the ions against the substrate.

The sputtering method is a method in which particles with an energy of from several hundred eV to several tens keV are made to collide with target atoms to cause nuclear collision so that the target atoms are ejected, which are transported to a substrate or a lens. The sputtering method is advantageous in that a higher density film will readily be formed as compared with the vacuum deposition method and that adhesion of the film with the substrate or the lens will be high. Also in a case where the antireflection film is formed by the sputtering method, the film hardness can be adjusted by the film deposition conditions.

Among them, the vacuum deposition method, the ion assisted deposition method or the sputtering method is preferred to achieve desired optical properties (controlling properties), film hardness and durability.

[Method for Producing Glass Substrate with Antireflection Film]

The glass substrate to be used for the glass substrate with an antireflection film of the present invention is produced, for example, as follows. That is, first, materials are weighed so as to achieve the above predetermined glass composition and uniformly mixed. The prepared mixture is poured into a platinum crucible, a quartz crucible or an alumina crucible and roughly melted. Then, the melt is put in a gold crucible, a platinum crucible, a platinum alloy crucible, a reinforced platinum crucible or an iridium crucible and melted within a temperature range of from 1,200 to 1,400° C. for from 2 to 10 hours, homogenized by fining, stirring or the like to remove bubbles, and cast into a mold and annealed, whereby the glass is obtained.

Further, the glass is molten and formed into a glass plate by float process, fusion process, roll out process or the like, whereby a glass substrate is obtained.

In the glass produced as mentioned above, the number of remaining bubbles is preferably at most 10 per kg (10 bubbles/kg), more preferably at most 7 bubbles/kg, further preferably at most 5 bubbles/kg, particularly preferably at most 3 bubbles/kg. In a case where a glass substrate is formed by the above method, when the number of the remaining bubbles is at most 10 bubbles/kg, a glass substrate containing no bubble can be efficiently formed. Further, taking the diameter of a minimum circle in the interior of which each remaining bubble is contained, as the size of each remaining bubble, the size of each remaining bubble is preferably at most 80 μm, more preferably at most 60 μm, further preferably at most 40 μm, particularly preferably at most 20 μm.

The aspect ratio of the shape of the remaining bubble, $L_2/L_1$, wherein $L_1$ is the length of the remaining bubble in the lengthwise direction, which is the above diameter, and $L_2$ is the length of the remaining bubble in the crosswise direction, which is the length of a straight line having the maximum length of the remaining bubble, among straight lines crossing at right angles with the diameter, is preferably at least 0.90, more preferably at least 0.92, further preferably at least 0.95. When $L_2/L_1$ is at least 0.90, the remaining bubble is close to a true circle (true sphere), and even if a remaining bubble is contained, a decrease of the glass strength can be suppressed as compared with a case of an elliptic remaining bubble, and when a glass substrate is prepared, breakage resulting from the remaining bubble can be suppressed. Further, even if a remaining bubble is present in the glass substrate, anisotropic scattering of light entering the glass substrate can be suppressed as compared with an elliptic remaining bubble. The size and the shape of the remaining bubbles are obtained from values measured by a laser microscope (manufactured by KEYENCE CORPORATION, VK-X100).

Then, on at least one principal plane of the above-obtained glass substrate, the antireflection film is formed by the above-described method such as the deposition method or the sputtering method to obtain a glass substrate with an antireflection film.

EXAMPLES

Example 1

A glass substrate was prepared as follows using a Si—Nb type glass which is a $SiO_2$ type glass, containing $Nb_2O_5$ as a high refractive index component and having a total content of $SiO_2$ and $Nb_2O_5$ in the glass component of at least 50 mass %. Raw material such as oxides of the Si—Nb type glass were melted and formed into a plate shape to obtain a glass substrate (thickness: 0.3 mm). Then, in the following procedure, an antireflection film was formed on one principal plane of the glass substrate by ion assisted deposition method to obtain a glass substrate with an antireflection film. Physical properties of the glass measured by the above methods are as follows.

Refractive index ($n_d$): 1.78, density (d): 3.3 g/cm$^3$, temperature $T_2$ at which the viscosity of the glass is log η=2: 1,080° C., devitrification temperature: 1,065° C., light transmittance ($T_{360}$): at wavelength of 360 nm when formed into glass plate having thickness of 1 mm: 74%, young's modulus (E): 60 GPa, water resistance: grade 1, acid resistance: grade 1, glass transition temperature (Tg): 592° C., Abbe number ($v_d$): 27, coefficient of thermal expansion α at from 50 to 350° C.: 80×10$^{-7}$/K, LTV: 1.1, warpage (as circular glass plate having diameter of 8 inches): 45 μm.

Figure 2:
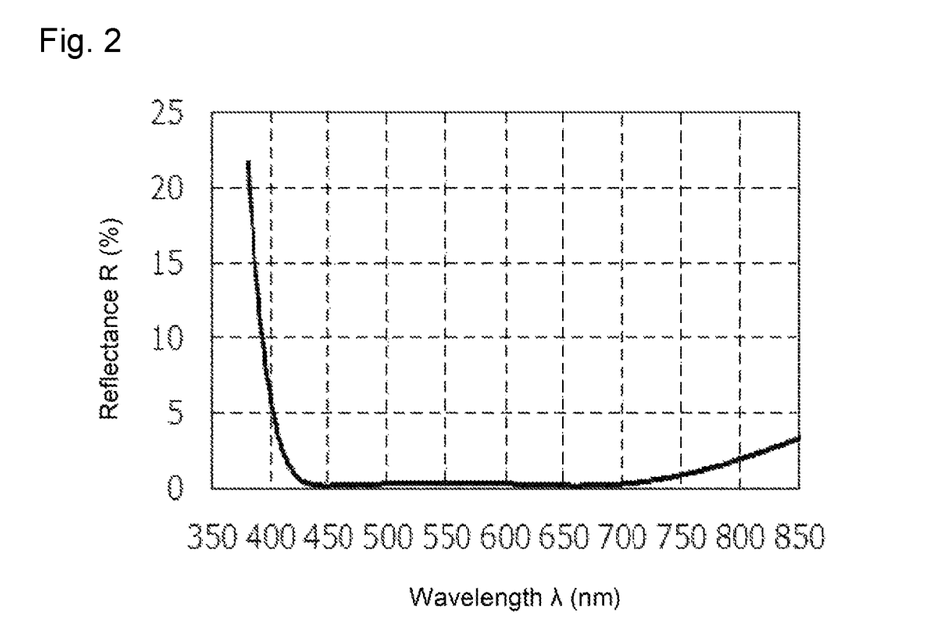
FIG. 2 is a view illustrating reflection properties of a glass substrate with an antireflection film according to an embodiment of the present invention.

The antireflection film produced in this Example 1 is a wide band antireflection film which prevents reflection of light in visible region, and is a 6-layered multilayer film having a thin film composed of $SiO_2$ (low refractive index film) and a thin film composed of $TiO_2$ (high refractive index film) alternately laminated as first to sixth layers from the glass substrate side. The reflection properties (luminous reflectance) of the obtained glass substrate with an antireflection film were measured by U-4100 manufactured by Hitachi High-Tech Corporation. The results are shown in FIG. 2. To measure the reflection properties, reflection on the non-film formed side having no antireflection film was removed. Further, the film thicknesses of the respective high refractive index films and low refractive index films constituting the antireflection film are as shown in Table 2.

TABLE 2

|  | Material | Film thickness (nm) |
| --- | --- | --- |
| First layer | $TiO_2$ | 18 |
| Second layer | $SiO_2$ | 23 |
| Third layer | $TiO_2$ | 68 |
| Fourth layer | $SiO_2$ | 11 |
| Fifth layer | $TiO_2$ | 38 |
| Sixth layer | $SiO_2$ | 100 |

The film hardness of the antireflection film in the above obtained glass substrate with an antireflection film, the surface strength of the principal plane having the antireflection film of the glass substrate with an antireflection film, and the acid resistance, were measured by the following apparatus and method. Further, the film surface roughness (Ra) of the antireflection film of the glass substrate with an antireflection film and the warpage of the glass substrate with an antireflection film were measured by the above method. The measurement area of the surface roughness (Ra) was 2 μm×2 μm, and the warpage was measured with respect to a circular glass plate having a diameter of 8 inches.

The measurement results are shown in Table 3.

[Film Hardness]

The film hardness was measured by nanoindentation method by bringing a Berkovich indenter into contact with the surface having the antireflection film under a load of 100 μN. Measurement was conducted by a nanoindenter (model: ESF-5000 Plus, manufactured by ELIONIX INC.).

[Surface Strength]

Figure 3A:
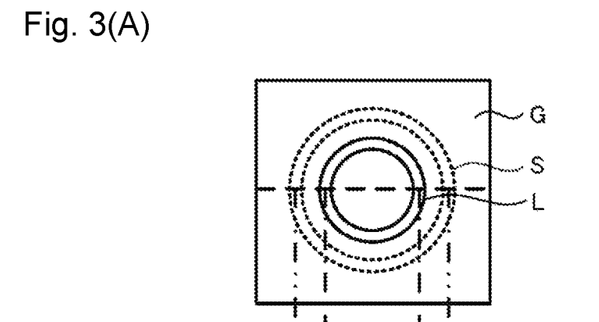
Figure 3B:
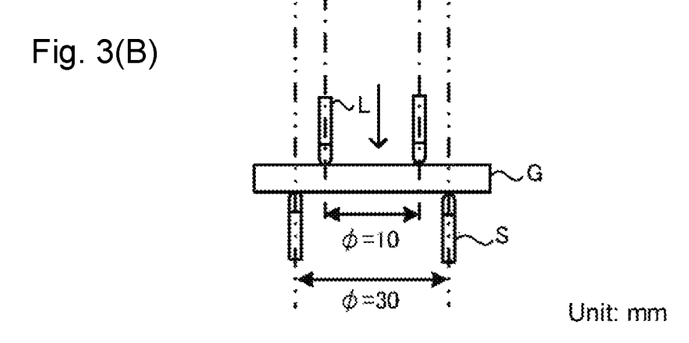
FIG. 3(B) is a side view, schematically illustrating a test method to measure surface strength of each sample in Examples of the present invention.

FIG. 3(A) is a plan view and FIG. 3(B) is a side view, schematically illustrating method for testing surface strength of a glass plate called ROR (Ring-on-Ring). As shown in FIGS. 3(A) and 3(B), a sample G of the glass substrate with an antireflection film was placed on a support ring S so that their centers agreed with each other and that the surface having the antireflection film faced the support ring S side. And, a load ring L having a diameter of 10 mm (based on the center) was pressed on the glass substrate with an antireflection film so that the center of the load ring L agreed with the center of the support ring S to apply a load on the glass substrate with an antireflection film, and the load when the glass substrate with an antireflection film was broken was measured. The diameter of the support ring S was 30 mm (based on the center of the support ring S). Such measurement was conducted with respect to 20 to 30 glass substrates with a low reflection film having the same thickness and the same constitution, and the average of the breaking loads of the glass substrates was taken as the surface strength of each sample G. Further, employing the obtained average surface strength, a value (surface strength) as calculated as 0.5 mm was obtained in accordance with the following formula. To measure the film strength, a tensile and compression testing machine manufactured by MinebeaMitsumi Inc. was used.

Film strength (N) as calculated as 0.5 mm=$B_{av}$×$(0.5/T)^2$

In the above formula, $B_{av}$ is the average load (N) when the glass substrate with an antireflection film was broken, and T is the plate thickness (mm) of the glass substrate in the glass substrate with an antireflection film actually measured.

[Acid Resistance]

The acid resistance of the glass substrate with an antireflection film was evaluated, by immersing the substrate in a piranha solution ($H_2SO_4$:$H_2O_2$=4:1 (mass ratio)) heated at 80° C. for 10 minutes, based on the evaluation standard ◯: no separation or discoloration of the film observed after immersion and ×: peeling or discoloration observed.

Example 2

A glass substrate with an antireflection film was obtained in the same manner as in Example 1 except that the irradiation amount of assisting ions in the ion assisted deposition method was two-thirds of Example 1. The reflection properties (luminous reflectance) of the obtained glass substrate with an antireflection film measured in the same manner as in Example 1 was at the same level as Example 1.

Example 3

A glass substrate with an antireflection film was obtained in the same manner as in Example 1 except that the irradiation amount of assisting ions in the ion assisted deposition method was one-third of Example 1. The reflection properties (luminous reflectance) of the obtained glass substrate with an antireflection film measured in the same manner as in Example 1 was at the same level as Example 1.

With respect to the glass substrates with an antireflection film obtained in Examples 2 and 3, the film hardness, the surface strength (as calculated as 0.5 mm thickness), the acid resistance, the warpage and the film surface roughness (Ra) were measured in the same manner as in Example 1, and the results are shown in Table 3.

COMPARATIVE EXAMPLE

With respect to the same glass substrate as in Example 1 but having no antireflection film formed thereon, the surface strength (as calculated as 0.5 mm thickness), the acid resistance, the warpage and the surface roughness (Ra) were measured in the same manner as in Example 1, and the results are shown in Table 3.

TABLE 3

| | Assisting ion irradiation amount | Film hardness (GPa) | Surface strength as calculated as 0.5 mm thickness (N) | Acid resistance | Warpage (μm) | Film surface roughness Ra (nm) |
|---|---|---|---|---|---|---|
| Example 1 | Intense | 4.5 | 885 | ○ | 50 (convex to film surface) | 0.85 |
| Example 2 | Medium | 4.0 | 755 | ○ | 12 (convex to film surface) | 0.79 |
| Example 3 | Weak | 3.8 | 923 | ○ | 20 (convex to film surface) | 0.93 |
| Comp. Example | Nil | — | 338 | — | 11 (convex to non-film surface) | 0.23 |

Examples 4 to 6

On one principal plane of the same glass substrate as in Example 1, an antireflection film was formed by sputtering method to obtain a glass substrate with an antireflection film. The antireflection film was formed so that the number of layers laminated, the materials and the film thicknesses were the same as in Table 2. In Examples 4 to 6, the film deposition pressure was changed to low, medium or high. On the basis of the film deposition pressure in Example 4, the film deposition pressure in Example 5 was double that in Example 4, and the film deposition pressure in Example 6 was 2.67 times that in Example 4.

With respect to the glass substrates with an antireflection film obtained in Examples 4 to 6, the film hardness, the surface strength (as calculated as 0.5 mm thickness), the acid resistance, the warpage and the film surface roughness (Ra) were measured in the same manner as in Example 1, and the results are shown in Table 4.

TABLE 4

| | Film deposition pressure | Film hardness (GPa) | Surface strength as calculated as 0.5 mm thickness (N) | Acid resistance | Warpage (μm) | Film surface roughness Ra (nm) |
|---|---|---|---|---|---|---|
| Example 4 | Low | 4.0 | 1,015 | ○ | 50 (convex to film surface) | 1.32 |
| Example 5 | Medium | 3.4 | 712 | ○ | 30 (convex to film surface) | 1.21 |
| Example 6 | High | 2.9 | 665 | x | 10 (convex to film surface) | 1.12 |

In Examples 1 to 6, the glass substrate having a $SiO_2$ type glass composition containing $SiO_2$ and $Nb_2O_5$ in a total amount of 50 mass % was covered with the antireflection film, and the same results are obtained when a glass substrate having the composition as identified in Table 1 is covered with the antireflection film.

INDUSTRIAL APPLICABILITY

The glass substrate with an antireflection film of the present invention has excellent strength even though high refractive index glass is used, and is thereby suitable as an optical member as a light guide plate or an optical filter for wearable devices, for vehicles, for robots, etc.

REFERENCE SYMBOLS

G1: Glass plate, G1F: one principal plane of glass plate, G1G: the other principal plane of glass plate, G1C: center line of glass plate, G1D: base line of glass plate, G1A: nodal line of optional cross section orthogonal to principal plane G1F, and principal plane G1F, G1B: nodal line of optional cross section orthogonal to principal plane G1G, and principal plane G1G, A: minimum distance in vertical direction between base line G1D and center line G1C, B: maximum distance in vertical direction between base line G1D and center line G1C, C: difference between maximum distance B and minimum distance A

What is claimed is:

1. A glass substrate with an antireflection film, comprising a glass substrate which consists of glass having a refractive index ($n_d$) of from 1.68 to 2.00 and which has plate thickness of from 0.01 to 2 mm, and an antireflection film formed on at least one principal plane of the glass substrate, wherein the glass substrate does not contain BaO, wherein the antireflection film has a hardness of from 3.0 GPa to 6.0 GPa as measured by nanoindentation method using a Berkovich indenter under a load of 100 μN.

2. The glass substrate with an antireflection film according to claim 1, wherein the surface having the antireflection film has surface strength of from 600 N to 1,200 N as calculated as glass substrate thickness of 0.5 mm, as measured by ring-on-ring test.

3. The glass substrate with an antireflection film according to claim 1, wherein the antireflection film comprises a high refractive index film formed of at least one member selected from the group consisting of titanium oxide, niobium oxide and tantalum oxide, and a low refractive index film formed of at least one member selected from the group consisting of silicon oxide, aluminum oxide and magnesium oxide alternately laminated.

4. The glass substrate with an antireflection film according to claim 1, wherein the glass has density (d) of at most 4.0 g/cm³, and a temperature $T_2$ at which the viscosity of the glass is log η=2 of from 800 to 1,200° C.

5. The glass substrate with an antireflection film according to claim 1, wherein the glass has the following composition as represented by mass % based on oxides:

$Nb_2O_5$: 5% to 65%, at least one member selected from the group consisting of $TiO_2$, $ZrO_2$, WO3 and $Ln_2O_3$ wherein Ln is at least one member selected from the group consisting of Y, La, Gd, Yb and Lu: 0% to 30%, $SiO_2$: 15% to 50%, $Li_2O+Na_2O+K_2O$: 2% to 20%, and $Li_2O/(Li_2O+Na_2O+K_2O)$: at most 0.45.

6. The glass substrate with an antireflection film according to claim 1, wherein the glass has the following composition as represented by mass % based on oxides:

MgO: 0% to 10%,
CaO: 0% to 15%,
SrO: 0% to 15%,
$Li_2O$: 0% to 9%,
$Na_2O$: 0% to 10%,
$K_2O$: 0% to 10%,
$Al_2O_3$: 0% to 5%,
$TiO_2$: 0% to 15%,
$WO_3$: 0% to 15%,
$ZrO_2$: 0% to 15%, and
ZnO: 0% to 15%.

7. The glass substrate with an antireflection film according to claim 1, wherein the glass has devitrification temperature of at most 1,200° C.

8. The glass substrate with an antireflection film according to claim 1, wherein the glass has a light transmittance ($T_{360}$) at a wavelength of 360 nm of at least 30%, when formed into a glass plate having thickness of 1 mm.

9. The glass substrate with an antireflection film according to claim 1, wherein the glass has Young's modulus (E) of at least 60 GPa.

10. The glass substrate with an antireflection film according to claim 1, wherein of the glass, the water resistance grade is 2 or higher, and the acid resistance grade is 1 or higher, as measured in accordance with Japan Optical Glass Industrial Standards.

11. The glass substrate with an antireflection film according to claim 1, wherein the glass has glass transition temperature (Tg) of from 500 to 700° C., Abbe number ($v_d$) of at most 50, and coefficient of thermal expansion α at from 50 to 350° C. of from 50 to $150 \times 10^{-7}$/K.

12. The glass substrate with an antireflection film according to claim 1, wherein of the glass substrate, one principal plane has an area of at least 8 $cm^2$.

13. The glass substrate with an antireflection film according to claim 1, wherein the glass substrate is a glass plate of which both facing principal planes are polished, and LTV of the glass plate in an area of 25 $cm^2$ of one principal plane is at most 2 μm.

14. The glass substrate with an antireflection film according to claim 1, wherein when the glass is formed into a circular glass plate having a diameter of 8 inches, warpage of at least one principal plane is at most 50 μm.

15. The glass substrate with an antireflection film according to claim 1, wherein at least one principal plane of the glass substrate has surface roughness Ra of at most 2 nm.

16. An optical member, which comprises the glass substrate with an antireflection film as defined in claim 1.

* * * * *